Oct. 27, 1942.                R. H. COLSON ET AL                2,299,798
                    ELECTRICAL CLEARANCE MEASURING SYSTEM
                            Filed March 12, 1940
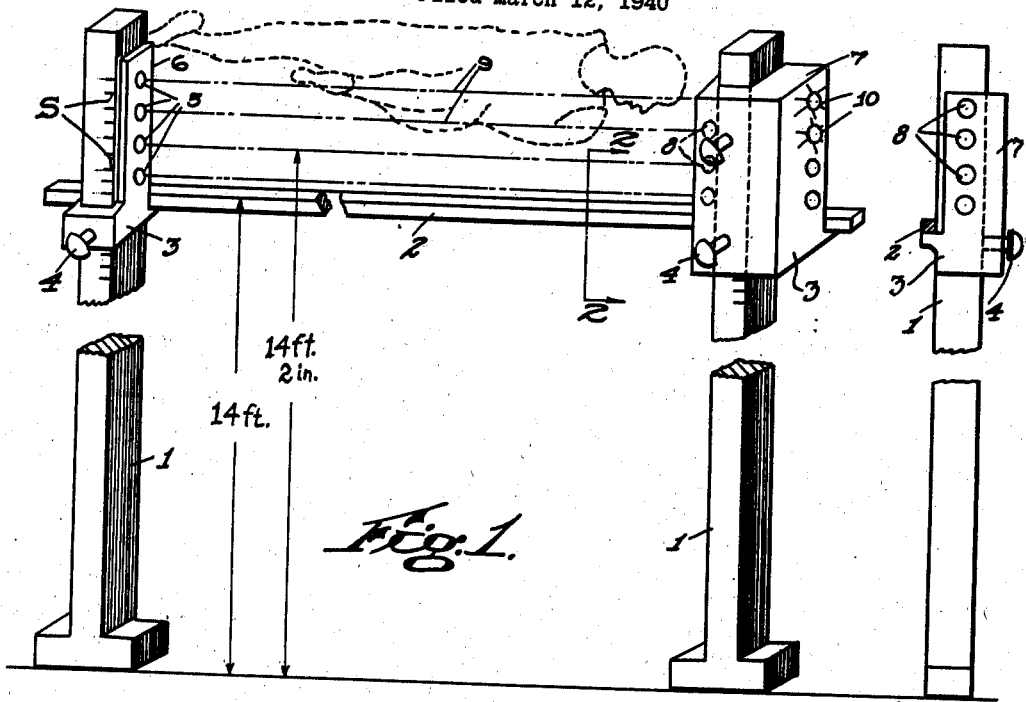
Fig. 1.
Fig. 2.
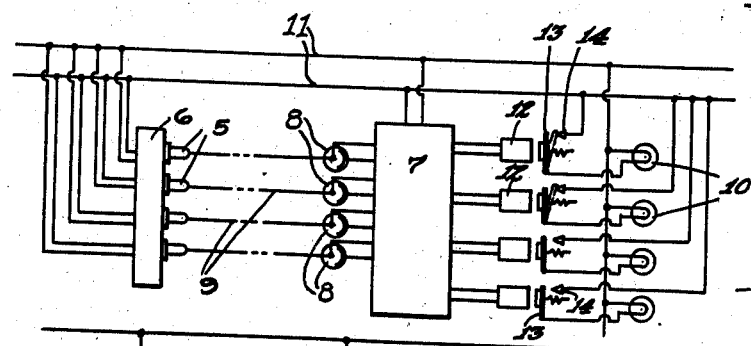
Fig. 3.
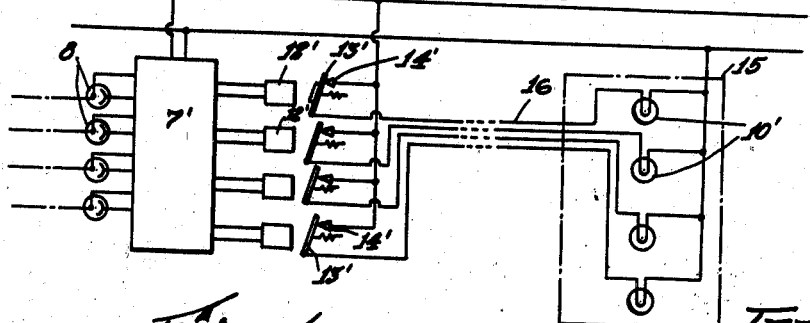
Fig. 4.
Inventors:
Ralph H. Colson
Eugene A. Sullivan
By Owen W. Kennedy
             Attorney Patented Oct. 27, 1942

2,299,798

UNITED STATES PATENT OFFICE 2,299,798

ELECTRICAL CLEARANCE MEASURING SYSTEM

Ralph H. Colson, West Roxbury, and Eugene A. Sullivan, Leominster, Mass.

Application March 12, 1940, Serial No. 323,636

1 Claim. (Cl. 177—384)

The present invention relates to an electrical measuring system for accurately determining and recording height clearances attained by performers in athletic events, such as pole vaulting and high jumping.

In conducting competitions involving jumping and vaulting, it has been customary to support a bar at increasing heights as the event progresses, with the actual setting of the bar for any one attempt giving the only measure of the height cleared by the performer. It frequently happens, however, that a performer may clear the bar by several inches in a given attempt, although on his next attempt with the bar raised, the bar will be displaced, with the result that the performer is not credited with the height that he actually cleared on his preceding jump or vault.

According to the present invention, we employ an automatic electric measuring system, in conjunction with the usual height determining bar supported between standards, whereby the actual clearance of the performer's body above the bar with any given setting is automatically recorded and indicated visually, so that the performer will be given credit for the height he has actually cleared in any given attempt, irrespective of the setting of the bar. The above and other advantageous features of the invention will hereinafter more fully appear from the following description with reference to the accompanying drawing, in which:

Fig. 1 is a perspective view illustrating the invention as used in connection with a pair of standards and bar of the type commonly employed in athletic events.

Fig. 2 is a sectional view along the line 2—2 of Fig. 1, looking in the direction of the arrows.

Fig. 3 is a wiring diagram of electrical apparatus employed in the measuring system.

Fig. 4 is a diagrammatic view of a modified form of electrical measuring apparatus.

Referring to Fig. 1 of the drawing, a pair of spaced standards 1 are shown as being of the type usually employed in connection with pole vaulting and high jumping competitions. A horizontal bar 2 is supported between the standards 1 by vertically adjustable brackets 3 adapted to be held by screw clamps 4 at different predetermined heights on the standards 1, as indicated by suitable scale markings S on each standard 1.

The invention contemplates the association with one bracket 3 of a series of light sources 5 spaced equally within a casing 6 at predetermined distances above the top of the bar 2; for example, at intervals of one inch. The other bracket 3 provides a control cabinet 7, on the inside of which there are exposed a number of light sensitive indicating devices 8, such as photo-electric cells, spaced equally above the bar 2 at intervals exactly coinciding with the intervals between the light sources 5. Thus light beams 9 pass from the light sources 5 to the cells 8 along a series of equally spaced parallel planes, as indicated by dot and dash lines in Fig. 1.

The control cabinet 7 also provides on the outside of the standard 1 a series of indicating devices 10, such as electric lamps corresponding in number to the photo-cells 8. While for purposes of illustration, the lamps 10 are shown in Fig. 1 as having the same vertical spacing as the cells 8, obviously the lamps 10 can be more widely spaced apart and located away from the control cabinet, as hereinafter described with reference to Fig. 4.

Referring now to Fig. 3, the light sources 5 are shown as being energized from a suitable source of electrical energy, such as supply mains 11, from which the control cabinet 7 is also energized. The terminals of the photo-electric cells 8 are also connected to the cabinet 7 which contains well-known commercially available apparatus, whereby individual variations in the output of the cells 8 will be reflected in variations in the energization of individual relay windings 12 also connected to the cabinet 7. The functioning of the appartus within the cabinet 7 is such that as long as light beams 9 pass uninterruptedly from the light sources 5 to the cells 8, the several relay windings 12 will each be sufficiently energized to maintain a movable contact 13 out of engagement with a stationary contact 14.

Each signal lamp 10 has one terminal connected to a supply main 11, while the other terminal thereof is connected to the movable contact 13 of a relay. Since the stationary contact 14 of each relay is connected to the other supply main 11, it is evident that as long as a relay winding 12 remains energized, the corresponding signal lamp 10 will remain unilluminated. Thus with the system in its normally energized condition as indicated in Fig. 3, the several lamps 10 shows no illumination, due to the uninterrupted passage of all of the light beams 9 between the standards 1.

Let it now be assumed that the apparatus is being used in connection with a pole vaulting competition with the bar 2 supported between the brackets 3 at a height of fourteen feet as indicated in Fig. 1, and that the body of the performer, indicated in dotted lines, has cleared the bar 2 by an appreciable amount. Under conditions heretofore existing, the performer would be credited with a vault of only fourteen feet, even though the lowermost portion of his body is far enough above the bar 2 so as not to interrupt the two lowermost light beams 9.

However, with our improved measuring system, it is evident that when the performer's body interrupts the two uppermost light beams 9, the change in conductivity of the two uppermost cells 8 will be such as to cause deenergization of the corresponding relay windings 12 and consequent illumination of the two uppermost lamps 10 as indicated by the dotted line position of the relay arms 13 in Fig. 3. Since the two lowermost light beams 9 were not interrupted by the passage of the performer's body in the space immediately above the bar 2, the relays under control of the two lowermost cells remain energized, so that the two lowermost lamps 10 remain unilluminated. Consequently, the outside face of the control cabinet 7, as viewed from the right in Fig. 1, will show illumination of only the two uppermost lamps 10, and the fact that the two lower lamps remain dark will indicate to those judging the event that the performer has actually cleared a height of at least fourteen feet, two inches.

After a performer has cleared the bar 2, as set at a predetermined height, both brackets 3 can be simultaneously moved upwardly on the standards 1 and held in position at a new height by the clamps 4. Such adjustment of the bar 2 results in the whole control apparatus being shifted bodily to indicate clearances above the new setting of the bar, and the same condition holds true should the bar 2 be lowered with the brackets 3.

Referring now to Fig. 4, there is shown a modified circuit arrangement wherein the connections within the control cabinet 7' are such that continued illumination of a cell 8 from its light source 5 will result in deenergization of the corresponding relay winding 12'. Therefore, under normal conditions preparatory to recording a performance, all of the lamps 10' remain illuminated, due to the fact that all of the relay arms 13' are then in engagement with the stationary contacts 14'. Therefore, passage of a performer's body to interrupt one or more light beams 9 will result in the corresponding lamps 10' being extinguished, leaving the lower lamps illuminated to indicate that the performer has cleared the space occupied by the corresponding uninterrupted light beams. Furthermore, in Fig. 4, there is illustrated diagrammatically an arrangement whereby the indicating lamps 10' are on a panel 15 remote from the control cabinet 7' and connected thereto by suitable conductors 16. Such mounting of the indicating lamps permits them to be viewed by the judges from any angle, with any desired spacing between the lamps.

From the foregoing, it is apparent that by the present invention there is provided an improved electrical measuring system for determining height clearance, whereby the actual height cleared by a performer in any given attempt is correctly shown, in a manner that cannot be mistaken.

We claim:

Apparatus for determining height clearance in athletic events, comprising a pair of spaced vertical standards, brackets adjustable on said standards, a horizontal bar, means on said brackets for displaceably supporting said bar, means on one bracket for projecting light beams between said standards at regular intervals above the plane of said bar, light-sensitive means on the other bracket in positions corresponding to the positions of the light sources, and indicating devices corresponding in number to said light-sensitive means and controlled thereby for indicating the passage or nonpassage of a body in the space between said standards and above the plane of said bar.

RALPH H. COLSON.
EUGENE A. SULLIVAN.